H. W. CLARK.
COMBINATION VEHICLE TRUCK.
APPLICATION FILED FEB. 16, 1916.

1,194,141.

Patented Aug. 8, 1916.
2 SHEETS—SHEET 1.

WITNESSES:

INVENTOR
HENRY W. CLARK,

BY

ATTORNEYS

H. W. CLARK.
COMBINATION VEHICLE TRUCK.
APPLICATION FILED FEB. 16, 1916.
1,194,141.
Patented Aug. 8, 1916.
2 SHEETS—SHEET 2.
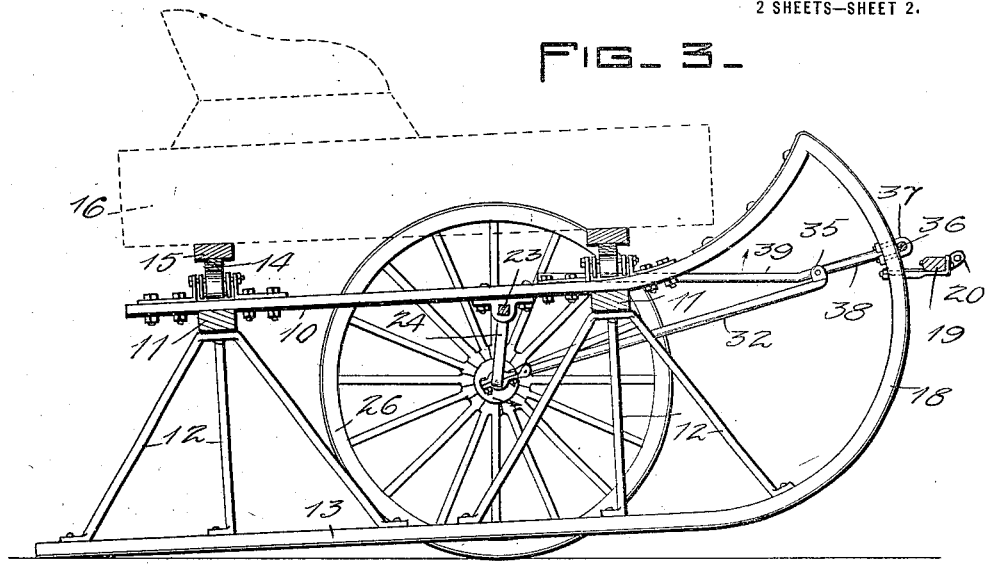
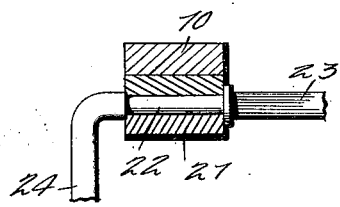
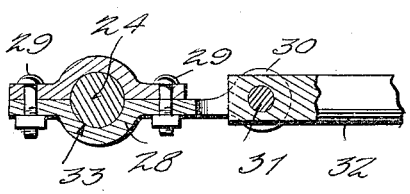
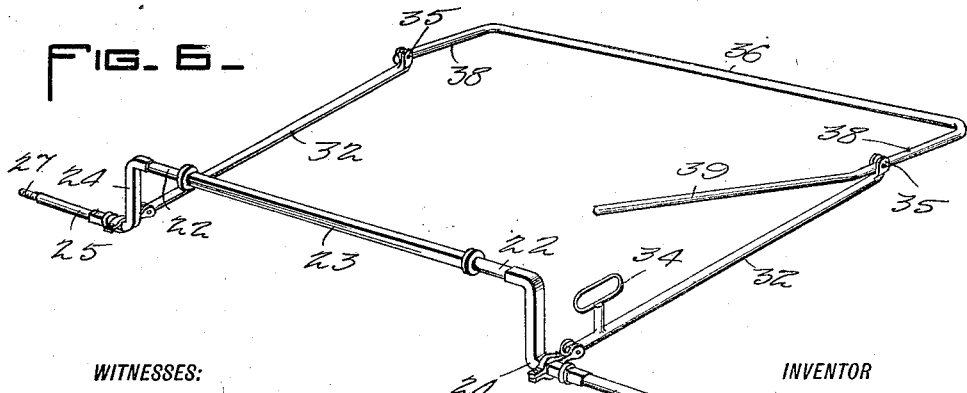
WITNESSES:
John X. Phillips Jr
Myron Clear
INVENTOR
HENRY W. CLARK.
BY
ATTORNEYS

UNITED STATES PATENT OFFICE.

HENRY W. CLARK, OF WEST VIENNA, NEW YORK.

COMBINATION VEHICLE-TRUCK.

1,194,141.  Specification of Letters Patent.  Patented Aug. 8, 1916.

Application filed February 16, 1916. Serial No. 78,635.

*To all whom it may concern:*

Be it known that I, HENRY W. CLARK, a citizen of the United States, and a resident of West Vienna, in the county of Oneida and State of New York, have invented a certain new and useful Improvement in Combination Vehicle-Trucks, of which the following is a specification.

My present invention relates generally to vehicle trucks, and more particularly to a combination cutter and wheel truck, by which the vehicle may be conveniently and quickly changed from a wheeled vehicle to a cutter dependent upon the presence of the necessary snow or ice upon which the cutter may travel, and the object of my invention is to provide a flexible device of this nature having connections, the nature of which admit of locking the wheels in raised or lowered position, and of the interchange during continuous movement of the vehicle in use.

Figure 1:
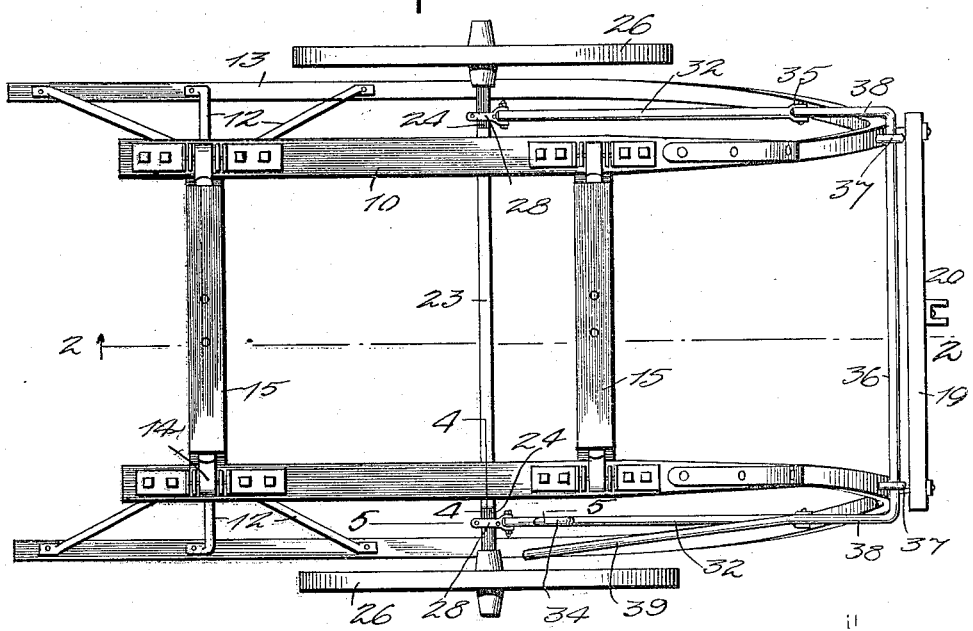
Figure 2:
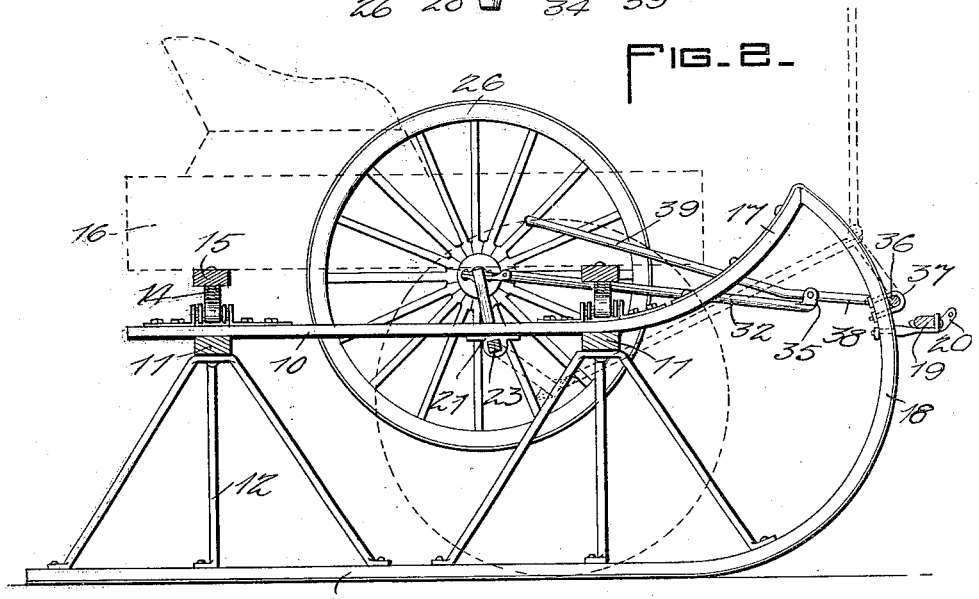

In the accompanying drawings in which I have shown the preferred embodiment of my invention, and which form a part of this specification: Figure 1 is a plan view of the truck complete. Fig. 2 is a vertical longitudinal section taken therethrough, substantially on line 2—2 of Fig. 1, and showing the wheels raised and in inoperative position. Fig. 3 is a similar view showing the wheel lowered in use. Fig. 4 is a detail section through one of the bearings of the wheel shaft taken on line 4—4 of Fig. 1. Fig. 5 is a similar view taken through the draw bar and crank connection on line 5—5 of Fig. 1. Fig. 6 is a detail perspective view of the wheel shaft and the operating connections thereof.

Referring now to these figures generally it will be seen that I provide a truck consisting of upper longitudinal side beams 10 connected by rigid cross bars 11, to the latter of which are rigidly connected the upper ends of vertical braces 12, the lower ends of which are similarly connected to the lower side runners 13. By reference to Figs. 1 to 3 in particular it will be seen that, the upper side bars 10 of the truck also support the relatively opposite ends of transverse springs 14 in turn supporting flexible cross bars 15 to the latter of which a body of suitable type and proportions, such as indicated in dotted lines at 16 in Figs. 2 and 3, may be bolted. It will also be noted that the forward ends of the lower side runners 13 are upturned and rigidly connected to the forward upturned ends 17 of the upper cross bars 10, the said upturned forward ends of the lower runners, as seen at 18, being connected to a cross bar 19 having an intermediate yoke 20 to which the necessary draft connections may be made. The upper side bars 10 are also provided intermediate their ends, and at points transversely alined and between the rigid cross bars 11, with bearings 21 in which the rounded portions 22 of a squared transverse shaft 23, as seen in Fig. 6, are journaled, the ends of this shaft being provided with offset crank portions 24 having rounded extensions 25 forming spindles for the wheels 26, the extremities 27 of which spindles may be threaded in order that the wheels may be secured thereon in the usual manner.

Referring now particularly to Figs. 5 and 6, it will be seen that each of the crank portions 24 of the shaft 23 is provided with a connecting member 28 rigidly secured thereto by bolts 29 and terminating at its forward end in laterally spaced ears 30 providing for the reception of a transverse pin 31 extending through the rear end of a draw bar 32, it being noted from Fig. 5, that the member 28 is disposed upon a rounded portion 33 of the respective crank 24 so as to permit of its swiveled movement with respect thereto. One of the draw bars 32 is provided with an upright handle 34 adjacent its rear end, and each of these draw bars is provided at its forward end with upright spaced apart ears 35.

Journaled horizontally and transversely across the upturned forward ends 18 of the lower side runner 13 is the cross bar of a U-shaped lever 36, the bearings of which may be seen at 37 in Figs. 1, 2, and 3, and the rearwardly projecting extensions 38 of which lever are pivotally connected to the ears 35 of the draw bars 32 before mentioned, one of these extensions 38 projecting rearwardly beyond the said pivotal connection with the respective draw bar 32, whereby to form a handle 39 by means of which the lever may be manipulated. Thus, with the parts as shown in Fig. 2, the wheels 26 being elevated in inoperative position, it will be noted that the spindles 25 are rearwardly beyond the center of the crank shaft 23 and that the draw bars 32 and lever 36 are in substantial alinement. Thus the weight of the wheels and the connections thereof is sufficient to maintain the wheels in the upper inoperative position, until the latter are split at the pivotal connections 35, by raising the handle 39 thus drawing the wheels forwardly until they drop to the ground of their own weight and are carried rearwardly upon engagement with the ground within the limits allowed by the extensions, including the draw bar 32 and lever 36. Thus the movement of the wheels 26 from inoperative position to operative position may be readily and quickly accomplished in a manner partly automatic.

With the wheels lowered as in Fig. 3 it is simply necessary to raise the handle 39 so as to draw the wheels forwardly, and with the parts in the dotted line position in Fig. 2, the operator grasps handle 34 and raises the wheels to the inoperative position as shown.

It is obvious that the interchange as desired may be readily and quickly accomplished, as the vehicle proceeds in its movements in use.

I claim:—

1. A combination vehicle truck of the character described having upper intermediate side bearings and lower runners provided with upturned forward ends, a transverse shaft journaled in said bearings and provided with crank arms at its opposite ends having extensions forming wheel spindles, wheels mounted on said spindles, draw bars at opposite sides of the truck having their rear ends flexibly connected to the said crank arms and provided with upwardly extending handles adjacent their said rear ends and with upright spaced ears at their forward ends, and a U-shaped lever journaled transversely across the forward upturned ends of the runners, having rearward extensions pivotally connected to the spaced ears of the said draw bars, and one of which extensions has a rearwardly projecting portion extending rearwardly of its pivot and forming an operating arm whereby the wheel shaft may be rotated to raise and lower the wheels.

2. A combination vehicle truck of the character described having upper side bars and lower runners provided with upturned forward ends connected to the forward ends of the upper side bars, a transverse shaft journaled across the upper side bars intermediate their ends and provided with crank arms at its opposite extremities having extensions forming wheel spindles and provided with rounded portions adjacent said spindles, wheels mounted on said spindles, connecting members swiveled on the said rounded portions of the said cranks, draw bars at opposite sides of the truck having their rear ends pivotally connected to the said connecting members and provided with upright spaced ears at their forward ends, a handle carried by one of the draw bars adjacent its rear end, and a U-shaped lever journaled transversely across the forward upturned ends of the runners, having rearward extensions pivotally connected to the said spaced ears of the draw bars, and one of which extensions has a rearwardly projecting portion extending beyond its pivot and forming an operating arm whereby the wheel shaft may be rotated to raise and lower the wheels.

3. A combination vehicle truck of the character described having upper side bars and lower side runners, a transverse shaft journaled across the said upper side bars and provided with crank arms at opposite sides of the truck having extensions forming wheel spindles, wheels mounted on the said spindles, draw bars at opposite sides of the truck having their rear ends flexibly connected to the said crank arms of the shaft, a handle projecting upwardly from one of the said draw bars, and a U-shaped lever journaled transversely across the forward portion of the truck, having rearward extensions pivotally connected to the forward ends of the said draw bars, and one of which extensions has a rearwardly projecting handle portion for manipulating the same whereby to rotate the wheel shaft and raise and lower the wheels.

4. A combination vehicle truck of the character described having lower side runners, wheels at opposite sides thereof, cranks upon which the said wheels are mounted to raise and lower, draw bars at opposite sides of the truck having their rear ends flexibly connected to the said cranks and one of which draw bars is provided with a handle, and a U-shaped lever journaled in the forward portion of the truck and having rearwardly projecting extensions pivotally connected to the forward ends of the said draw bars, one of which extensions is provided with a rearwardly projecting arm for the purpose described.

HENRY W. CLARK.

Witnesses:
HOMER I. PAGE,
HOWARD J. FAULKNER.

Copies of this patent may be obtained for five cents each, by addressing the "Commissioner of Patents, Washington, D. C."